Figure 1:
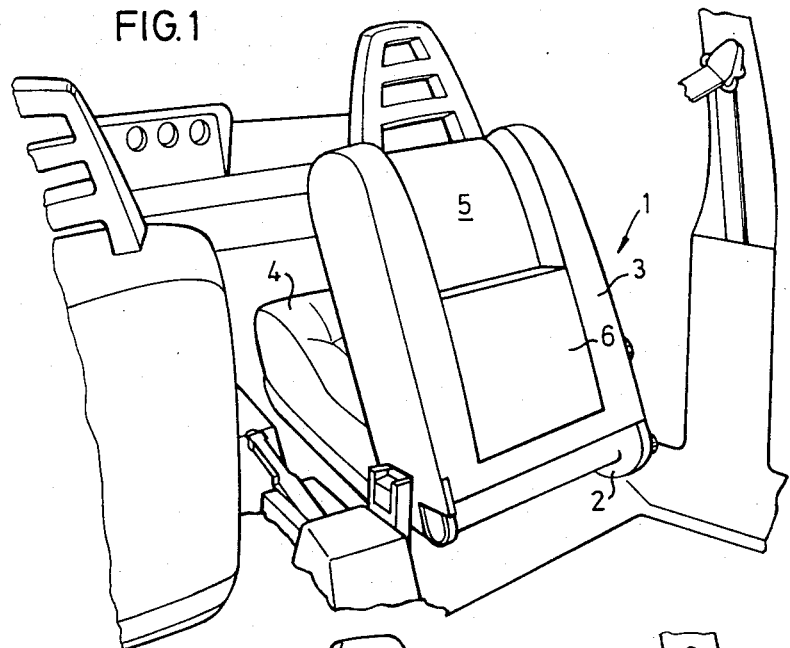

United States Patent [19]

Jonasson

[11] Patent Number: 4,541,654

[45] Date of Patent: Sep. 17, 1985

[54] SAFETY BELT ARRANGEMENT IN MOTOR VEHICLES

[75] Inventor: Kjell Jonasson, Torslanda, Sweden

[73] Assignee: AB Volvo, Gothenburg, Sweden

[21] Appl. No.: 571,544

[22] PCT Filed: May 17, 1983

[86] PCT No.: PCT/SE83/00196

§ 371 Date: Dec. 20, 1983

§ 102(e) Date: Dec. 20, 1983

[87] PCT Pub. No.: WO83/03978

PCT Pub. Date: Nov. 24, 1983

[30] Foreign Application Priority Data

May 18, 1982 [SE] Sweden ................. 8203136

[51] Int. Cl.[4] .................................... B60R 21/10
[52] U.S. Cl. ................................ 280/801; 297/483
[58] Field of Search ............... 280/801, 802, 808, 748; 297/468, 483, 238, 255

[56] References Cited

U.S. PATENT DOCUMENTS

| 1,379,499 | 5/1921 | Williford | 297/238 |
|---|---|---|---|
| 2,128,168 | 7/1937 | Schulz | 5/94 |
| 3,043,625 | 8/1959 | Bohlin | 297/389 |
| 3,220,769 | 11/1965 | Regen | 297/468 |
| 3,258,293 | 4/1964 | Sharp | 297/389 |
| 3,951,450 | 4/1976 | Gambotti | 297/238 |
| 3,953,070 | 4/1976 | Fisher | 297/389 |
| 4,244,601 | 1/1981 | Nilsson | 280/808 |
| 4,323,278 | 4/1982 | Sukopp et al. | 280/801 |

FOREIGN PATENT DOCUMENTS

| 925447 | 3/1955 | Fed. Rep. of Germany | 280/748 |
|---|---|---|---|
| 1360567 | 3/1964 | France | 297/255 |

Primary Examiner—Joseph F. Peters, Jr.
Assistant Examiner—Ross Weaver
Attorney, Agent, or Firm—Young & Thompson

[57] ABSTRACT

A safety belt arrangement in motor vehicles, in which the belt has a band portion which during use runs from a real mechanism on one side of the vehicle seat, diagonally across the seat-back to a belt lock on the opposite side of the seat. The belt lock (14) is arranged so that the belt (10,11) can be disposed optionally across the front or across the back of the seat-back (3). A redirecting fitting (16;24) is joined to the seat-back and serves as a guide for the diagonal band portion when it is disposed on the back of the seat-back.

7 Claims, 4 Drawing Figures

SAFETY BELT ARRANGEMENT IN MOTOR VEHICLES

The present invention relates to a safety belt arrangement in motor vehicles, in which the belt has a band portion which during use runs from a reel mechanism on one side of the vehicle seat diagonally across the seatback to a belt lock on the opposite side of the seat.

When a child is riding in the car, the usual protective system, usually a three-point belt, cannot be used due to the size and build of the child and the geometry of the belt system. It is most advisable today for children who are no longer infants up to six years of age to sit in a children's seat facing backwards, which can be placed in the frontseat or the backseat. Children from six years of age up to ten years of age should sit on a cushion, elevating them somewhat so that the child can be held in place with the ordinary car safety belt.

Common to these protective devices is that a number of components must be bought as a complement to the standard equipment of the automobile in order to provide adequate protection for the child. In certain cases problems may arise with installation of the protective system and removal and storage in the car when the seats are to be used by adults. Children's seat and cushions are very seldom bought for vehicles which are only used occasionally for children, which means that the children will ride in an insecure manner.

The purpose of the present invention is to achieve a safety belt arrangement of the type described above by way of introduction, which is particularly intended to be used together with a children's seat formed by a flap, which is supported by the back of the seat-back and which can be folded between a rearwardly directed position for use in which the flap forms a seat for the child, and in upwardly directed storage position. This is achieved according to the invention by arranging the belt lock so that the belt can be disposed optionally across the front or across the back of the seat-back, and that a redirecting fitting is joined to the seat back and serves as a guide for the diagonal band portion when it is disposed on the back of the seat back.

Safety belts of this type usually have the belt lock fixed on an obliquely forwardly directed strap between the seats. By arranging these straps so that they can also be angled backwards somewhat, the belt can be drawn across the back of the seat-back, so that the regular vehicle belt can be used both as an adult belt and a children's belt. The redirecting fitting is then placed at such a height on the side of the seat-back so that the diagonal band portion of the belt lies properly against the child's chest providing good belt geometry.

Figure 2:
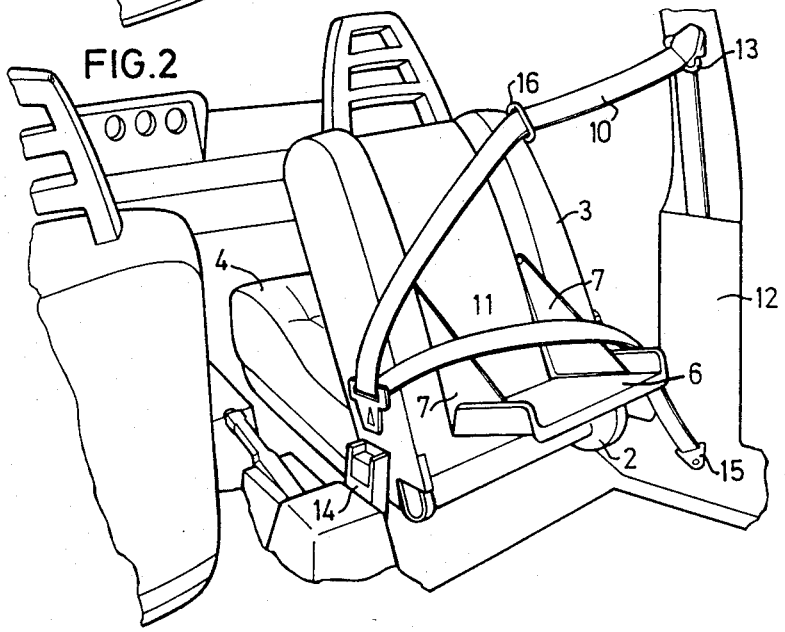
Figure 3:
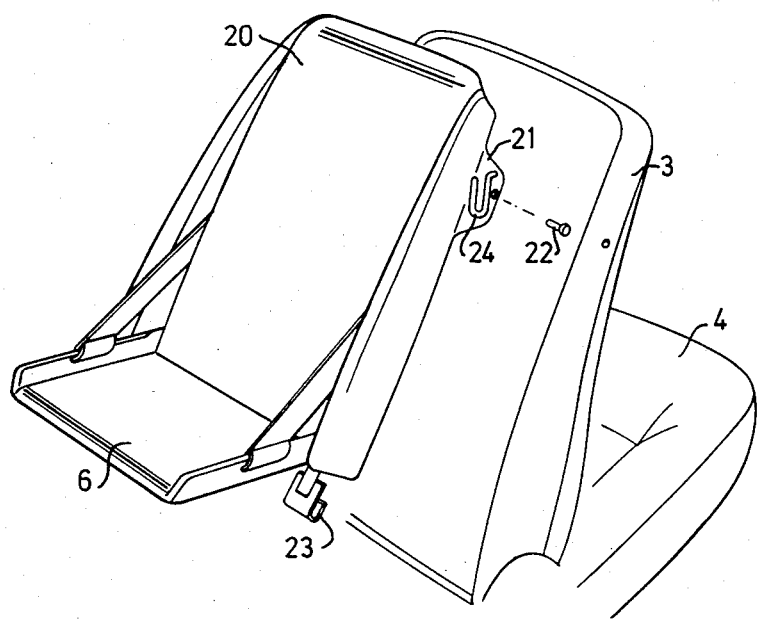
Figure 4:
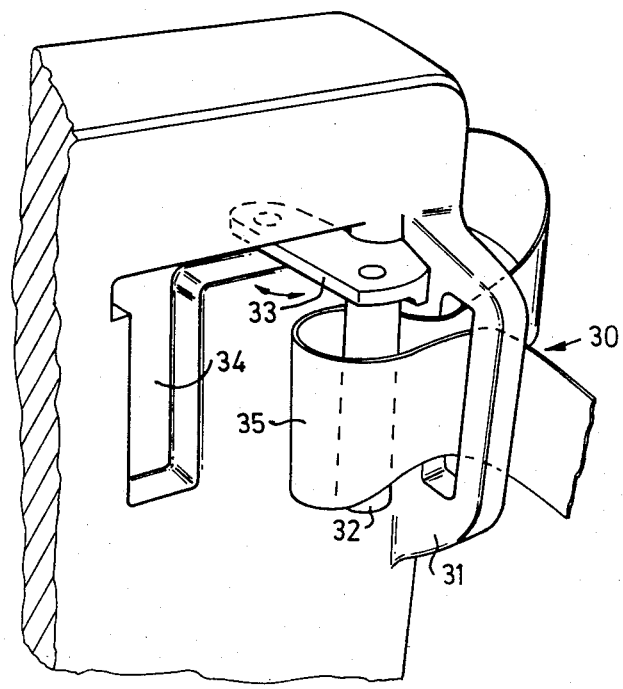

The invention will be described in more detail with reference to embodiments shown in the accompanying drawings. FIGS. 1 and 2 show perspective views of the front passengers' seat with a built-in children's seat in the storage position and in the position for use, respectively. FIG. 3 shows the perspective view of the children's seat as an addition to a conventional vehicle seat. FIG. 4 shows an enlarged view of a redirecting fitting.

The seat 1 shown in FIGS. 1 and 2 has a folding mechanism 2, which permits the seat-back 3 to be fixed in a forwardly inclined position, in which the seat-back 3 forms an acute angle with the seat bottom 4. The back of the seat-back is made with a cavity 5, at the lower end of which a flap 6 is pivoted. The flap can be folded between an upwardly directed storage position (FIG. 1), in which it is folded into the cavity, and a rearwardly directed position (FIG. 2), in which it serves as a children's seat. The flap is held in the latter position with the aid of a pair of side pieces 7, of cloth or plastic for example, fixed to the side edges of the flap and the cavity and which can be folded in behind the flap when it is folded up.

As can be seen in FIG. 2, the standard three-point belt or harness can also be used for the children's seat. The safety belt which is of conventional type with a diagonal chest band 10 and a hip band 11, runs from a reel mechanism hidden behind the panel 12, via a redirecting fitting 13 to a belt lock 14 between the seats. In order to enable the belt to be drawn alternatively across the front of the seat-back and across the back of the seatback, the belt lock 14 is arranged on a strap (not shown) which is swingably mounted in the vehicle floor or on the seat, so that the lock can be swung between the position shown in FIG. 2 and an obliquely forwardly directed position. The anchoring 15 of the hip band 11 is pivotly mounted on the inside of the car body, but can alternatively be fixed to the seat. The correct positioning of the chest band 10 against the child's body can be achieved with the aid of the redirecting fitting 16 fixed to the side of the seat-back. The fitting shown in FIG. 2 encircles the entire band 10 and can be opened (not shown in more detail here) for example as according to the same principle as a snap hook, so that the band can be simply shifted between the front and back of the seat-back. Alternatively, the fitting can be open upwards or detachable from the seat and displacement towards the redirecting fitting 13 for example. If the redirecting fitting 16 is arranged to be displaceable and lockable in various vertical positions, for example on a rail fixed to the side of the seat-back, children of more widely varying heights can use the children's seat.

FIG. 3 shows a children's seat, the flap 6 of which is pivoted in a separate seat-back 20 which can be fixed to the back of a conventional front seat-back 3. For this purpose the seat-back 20 is made with ears 21 which project over the sides of the seat-backs 3 and are intended to be fixed thereto with screws 22. The bottom of the children's seat is provided with a pair of hooks 23 which are hooked under the front seat-back before the screws 22 are screwed in place.

If the front seat is provided with a head rest, attachment bands around the head rest can be used as an alternative to the screw fastening. In the embodiment according to FIG. 3, the children's seat is provided with a U-shaped upwardly open redirecting fitting 24. This fitting, as is the redirecting fitting 16 in the previously described embodiment, is placed on the side of the seat-back so as to minimize belt friction against the seat-back so as not to introduce unnecessary slack in the belt system.

FIG. 4 shows a redirecting fitting 30 consisting of a complete eye 31 securely fixed to the seat-back 3 and a pin 32 carried by an arm 33. The arm 33 with the pin 32 can be swung from the position shown into a cavity 34 in the back of the seat-back.

When the standard belt is to be used as a children's belt on the back of the seat-back, a loop 35 is made in the band portion 10 and is inserted through the eye 31 and slipped around the extended pin 32 as shown in the figure. The advantage of this arrangement is that the links of the band portion 10 is fixed in the redirecting fitting while permitting simple link adjustment.

I claim:

1. Safety belt arrangement in motor vehicles, in which the belt has a band portion which during use runs from a reel mechanism on one side of a vehicle seat, diagonally across the seat-back to a belt lock on the opposite side of the seat, characterized in that the belt lock (14) is arranged so that the belt (10, 11) can be disposed optionally across the front or across the back of the seat-back (3), and that a redirecting fitting (16; 24) is joined to the seat-back and serves as a guide for the diagonal band portion when it is disposed on the back of the seat-back.

2. Arrangement according to claim 1, characterized in that the redirecting fitting (16) is attached directly to the seat-back (3).

3. Arrangement according to claim 1, characterized in that the redirecting fitting (24) is attached to the back-rest (20) of a children's seat detachably fixed to the back of the seat-back (3).

4. Arrangement according to claim 1, characterized in that the redirecting fitting (30) is a fitting which locks the band.

5. Arrangement according to claim 1, characterized in that the redirecting fitting (30) comprises a whole eye (31) into which a loop (35) of the belt can be inserted, and a holding member (32) which can be inserted into the loop to prevent the loop from being pulled out of the eye.

6. Arrangement according to claim 1, characterized in that the redirecting fitting is a U-shaped fitting (24) which is open upwards.

7. Arrangement according to claim 1, characterized in that the redirecting fitting is an openable fitting (16) which encircles the belt band.

* * * * *